(12) United States Patent
Iljin

(10) Patent No.: US 6,663,289 B1
(45) Date of Patent: Dec. 16, 2003

(54) BEARING WITH MULTI-LAYERED SPACERS

(76) Inventor: Pablo Javier Iljin, 1059 Hagen Ct., Simi Valley, CA (US) 93065

( * ) Notice: Subject to any disclaimer, the term of this patent is extended or adjusted under 35 U.S.C. 154(b) by 0 days.

(21) Appl. No.: 10/218,389

(22) Filed: Aug. 13, 2002

Related U.S. Application Data

(62) Division of application No. 09/450,988, filed on Nov. 29, 1999, now abandoned.

(51) Int. Cl.[7] ............................................. F16C 33/10
(52) U.S. Cl. .................. 384/276; 384/289; 384/129; 384/300; 384/302; 384/901
(58) Field of Search ................... 384/276, 275, 384/280, 282, 290, 296, 289, 129, 302, 303, 322, 368, 627, 424, 427, 7, 13, 26, 42, 901, 220, 221, 222, 297, 299, 300, 420, 246

(56) References Cited

U.S. PATENT DOCUMENTS

| 1,594,054 | A | * | 7/1926 | Fiego | 384/246 |
| 1,832,488 | A | * | 11/1931 | Larrabee | 384/246 |
| 3,056,637 | A | * | 10/1962 | Shanley et al. | 384/246 |
| 4,720,198 | A | * | 1/1988 | DeBruyn | 384/246 |

\* cited by examiner

*Primary Examiner*—Thomas R. Hannon
*Assistant Examiner*—Colby Hansen
(74) *Attorney, Agent, or Firm*—Edgar W. Averill, Jr.

(57) ABSTRACT

A bearing with one or more layers of lubricated spacers for dynamically brace-supporting first and second slide surfaces independently movable relative to each other. The spacers are positioned between the first and second slide surfaces, and each spacer has a pair of opposing spacer slide surfaces which are adapted to slide in surface-to-surface contact relative to an adjacent slide surface. Lubricants are used to facilitate low friction relative sliding motion between the slide surfaces, which can be either bonded to the spacers, or separately deposited between the slide surfaces.

1 Claim, 2 Drawing Sheets

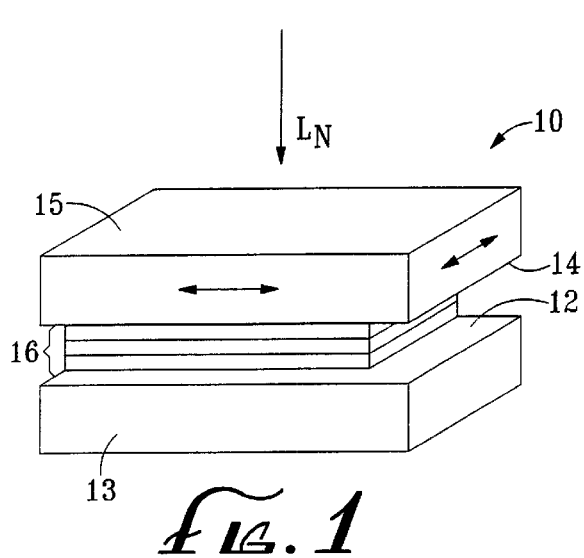
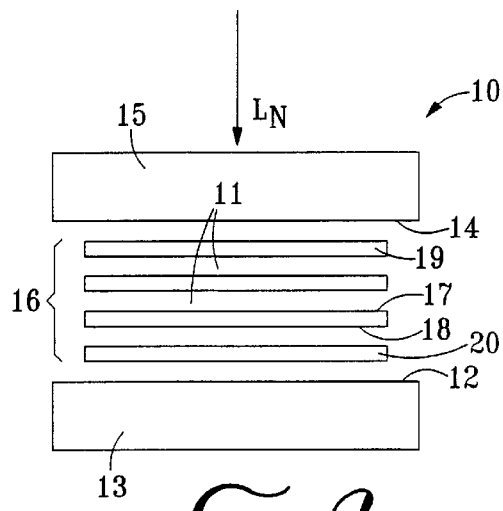
*fig.1*  *fig.2*
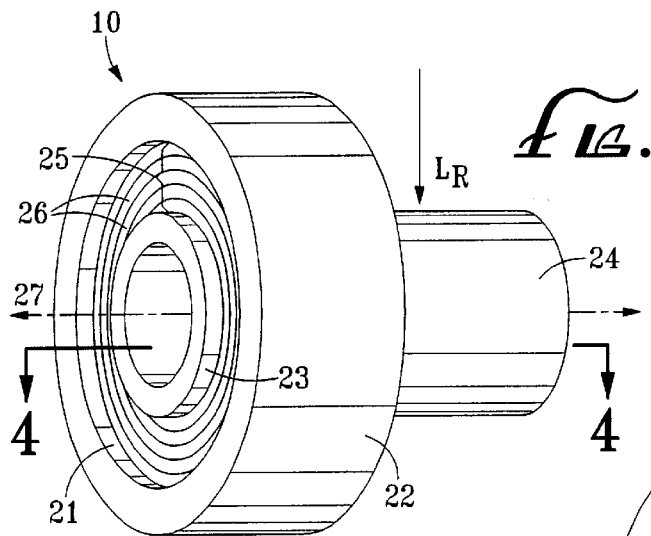
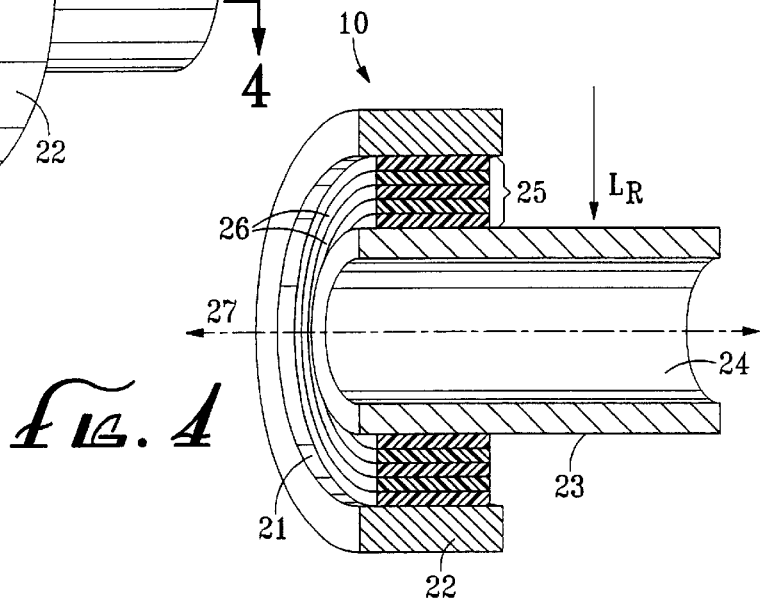
*fig.3*  *fig.4*

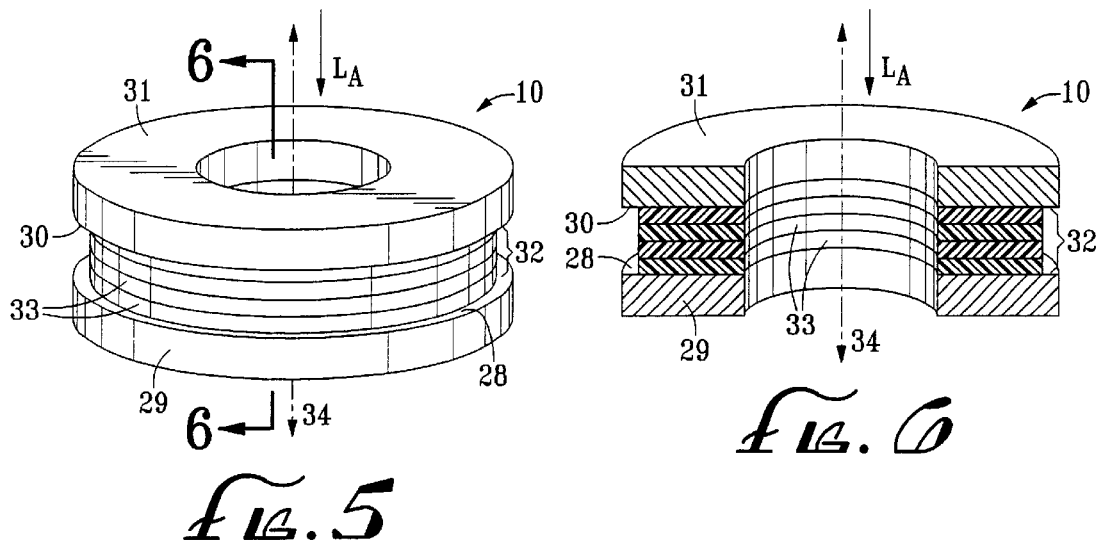
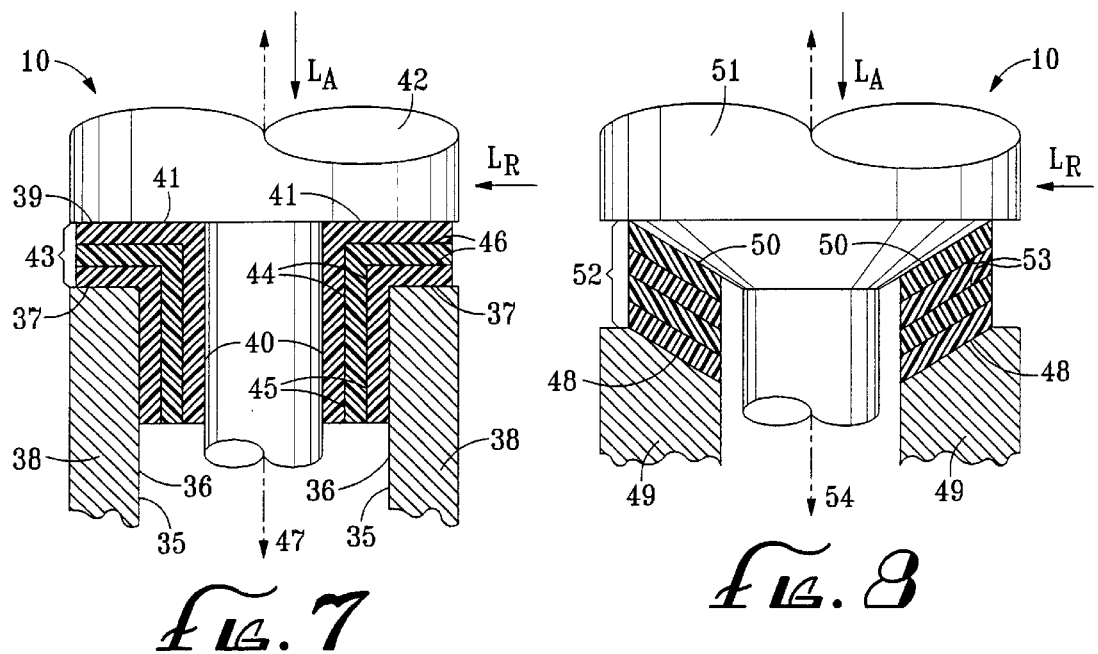

US 6,663,289 B1

BEARING WITH MULTI-LAYERED SPACERS

CROSS REFERENCE TO RELATED APPLICATIONS

This application is a divisional application of applicant's application Ser. No. 09/450,988 filed Nov. 29, 1999 now abandoned.

BACKGROUND OF THE INVENTION

The field of the invention generally pertains to bearings. The invention relates more particularly to a bearing having one or more layers of lubricated spacers which are positioned to slide in surface-to-surface contact between a pair of surfaces independently movable relative to each other, wherein the spacers provide for a more uniform load distribution while reducing the relative sliding velocities of the pair of surfaces.

Various types of bearings have been used to reduce and/or overcome friction, the physical phenomena which resists relative sliding motion between solid bodies. In particular, many bearing designs typically incorporate the use of ball or roller elements to reduce friction by producing a rolling effect between moving surfaces. One example of this type of bearing is shown in U.S. Pat. No. 2,782,079, disclosing a railroad coaster bearing having a plurality of concentrically layered conical roller bearings 48, 50, 56, 58, 72, 74, which rotatably support annular race members 60, 62. The annular race members are rotatably mounted between the roller bearings for free movement relative to the fixed bearing support 10 and the rotating shaft 24. Additionally, in U.S. Pat. No. 2,941,853, a thrust bearing is shown disclosing multiple ball bearings, 15, 16, 17 positioned in layers along the longitudinal axis of a rotating shaft 11 for supporting axial thrusts. Each layer of ball bearings is supported by concentric annular pistons 20, 21, 22, such that axial thrusts against the ball bearings are distributed to the annular pistons.

Perhaps the greatest disadvantage of such ball or roller bearings disclosed in patents '079, and '853, however, is the inadequate load distribution caused by the relatively small area of contact between the balls or rollers and the sliding surfaces, e.g. the races. Loads placed on the bearing are concentrated at the contact points such that indentations known as "pits" are formed on the race surface, and/or the balls or rollers themselves experience some deformation at their contact points. Typically, ball or roller bearings have limited lives that are measured by the number of revolutions that can be tolerated under a given load before the ball or roller surfaces develop "pits". Because of this limitation, ball bearings are typically not suitable for supporting heavy or impact loads.

In contrast to ball or roller-type bearings, another type of bearing known as hydrostatic bearings have been commonly used to provide uniform load distribution. In U.S. Pat. No. 4,542,994, one embodiment of a hydrostatic bearing is shown having a ring-shaped member 24 hydrostatically suspended between a housing member 1 and a rotating shaft member 2. Hydrostatic suspension is provided by two separate pressure sources: a first pressure source 29 which maintains a clearance between the ring-shaped member 24 and the surrounding channel, and a separate second pressure source 4 which maintains the clearance 9 between the shaft member 2 and a circumferential land portion 7c of the ring-shaped member 24.

While hydrostatic bearings can provide uniform support and avoid the possibility of "pitting," this type of bearing requires a continuous supply of hydrostatic pressure from a pressure source. Although the use of complicated pressure delivery systems and devices may be justified for large scale, high precision applications, it is usually far too expensive for small-scale, self-contained bearing applications, such as in bicycle gears, small appliances, etc. Further, while the hydrostatic fluid suspension of a single race member can be relatively simply accommodated, the complexity and expense of multiple "floating" sleeves can far outweigh any benefits derived therefrom.

In summary, there is a need to provide a simple and cost-effective bearing capable of improving load distribution over a contact area while simultaneously reducing friction. Ideally, it would be advantageous to distribute load over an area comprising an infinite number of rollers to effect uniform load distribution and prevent pitting. However, while hydrostatic bearings are capable of providing desirable uniform load distributions, they are typically much too expensive for widespread use on more commonplace bearing applications.

BRIEF SUMMARY OF THE INVENTION

It is an object of the present invention to provide a simple, cost effective, and operationally efficient bearing having one or more layers of lubricated spacers for dynamically brace-supporting a pair of surfaces independently movable relative to each other.

It is a further object of the present invention to provide a bearing capable of improved load distribution over a contact surface area to avoid pitting commonly seen with ball and roller bearings under heavy and extreme load conditions.

It is a still further object of the present invention to provide a bearing capable of low relative velocities between adjacent moving surfaces, in order to reduce friction-generated heat.

The present invention is for a bearing for dynamically brace-supporting first and second slide surfaces which are independently movable relative to each other. The bearing comprises at least one spacer layeredly positioned between the first and second slide surfaces. The spacer(s) has a pair of opposing spacer slide surfaces, and each spacer slide surface is adapted to slide in surface-to-surface contact relative to a corresponding slide surface adjacent to it. In a first preferred embodiment, the bearing includes means for reducing friction between the slide surfaces to enable low friction sliding relative to each other. In a second preferred embodiment, the spacer(s) is comprised of a solid lubricant having a low coefficient of friction to enable low friction sliding between the slide surfaces. Additionally, the present invention can be in the form of various physical embodiments which enable low friction sliding while supporting various load conditions.

BRIEF DESCRIPTION OF THE DRAWINGS

FIG. 1 is a perspective view of a first embodiment of the bearing, having a linear bearing configuration.

FIG. 2 is an exploded front view of the first embodiment in FIG. 1.

FIG. 3 is a perspective view of a second embodiment of the bearing, having a journal bearing configuration.

FIG. 4 is a perspective, cross-sectional view of the second embodiment of the bearing taken along the line 4—4 of FIG. 3.

FIG. 5 is a perspective view of a third embodiment of the bearing, having a thrust bearing configuration.

FIG. 6 is a perspective cross-sectional view of the third embodiment of the bearing taken along the line 6—6 of FIG. 5.

FIG. 7 is a partly cross-sectional side view of a fourth embodiment of the bearing, having a combination journal and thrust bearing configuration.

FIG. 8 is a partly cross-sectional side view of a fifth embodiment of the bearing adapted to support both radial and axial loads.

DETAILED DESCRIPTION OF THE PREFERRED EMBODIMENTS

Referring now to the drawings, FIGS. 1–8 show various embodiments of the bearing, generally indicated at reference character 10. FIGS. 1–8 illustrate the wide-ranging application of the present invention in the form of conventional bearing types, including slider bearings (FIGS. 1, 2), journal bearings (FIGS. 3, 4), thrust bearings (FIGS. 5, 6), and combination journal and thrust bearings (FIGS. 7, 8). While the bearing 10 is embodied and employed differently depending on the nature of the bearing application, the essential elements of the bearing 10, including its operational principles, parameters, advantages, etc. remain the same.

As can be seen in FIGS. 1 and 2, a first embodiment of the bearing 10 is shown having a linear bearing configuration. The bearing 10 has a first slide surface 12 and a second slide surface 14 which are independently movable relative to each other, and are preferably the facing surfaces of a stationary bearing member 13 and a sliding bearing member 15, respectively. Furthermore, the bearing 10 also comprises at least one spacer, generally indicated at reference character 16. In FIGS. 1 and 2, an exemplary embodiment is shown having four spacers which are layeredly positioned between the first and second slide surfaces 12, 14. The spacers 16 facilitate linear sliding of the first and second slide surfaces 12, 14 while supporting a load $L_N$ normal to the first and second slide surfaces 12, 14.

Details of the first embodiment of the bearing 10 can be best seen in FIG. 2, showing an exploded front view of the first embodiment. In particular, each of the spacers 16 has a pair of opposing spacer slide surfaces 17, 18 which are each adapted to slide in surface-to-surface contact relative to a corresponding slide surface 12, 14, 17, 18 adjacent thereof. For example, a top spacer 19 is positioned to slide in surface-to-surface contact relative to the second slide surface 14 on its top spacer slide surface 17, and in surface-to-surface contact relative to a spacer slide surface 17 of the spacer positioned directly below it. And the bottom spacer 20 is positioned to slide in surface-to-surface contact relative to the first slide surface 15 on its bottom spacer slide surface 18, and in surface-to-surface contact relative to a spacer slide surface 18 of the spacer positioned directly above it. Because each of the slide surfaces 12, 14, 17, 18 of the first embodiment have a planar configuration oriented parallel to each other, the surface-to-surface contact sliding occurs in a linear manner relative to each other. Further, sliding in surface-to-surface contact is possible due to the presence of a lubricant 11 between all slide surfaces 12, 14, 17, 18, as will be discussed in detail below.

Similar to FIGS. 1 and 2, FIGS. 3–8 show alternative embodiments of the bearing 10. In particular, FIGS. 3 and 4, show the bearing 10 having a journal bearing configuration and also comprising at least one spacer 25 layeredly positioned between a first slide surface 21 and a second slide surface 23. Five spacers 25 are shown in FIGS. 3 and 4, each having a pair of opposing spacer slide surfaces 26. The slide surfaces 21, 23, 26 each have a hollow cylindrical or sleeve configuration telescopically positioned relative to each other for sliding in surface-to-surface contact. As shown in FIGS. 3 and 4, the first slide surface 21 is preferably the inner surface of a fixed shaft housing 22, and the second slide surface is preferably the outer surface of a rotating shaft 24. And similar to the linear bearing in FIGS. 1 and 2, a lubricant 11 is also present between the slide surfaces 21, 23, 26 to enable low friction sliding. However, unlike the slider bearing in FIGS. 1 and 2, the journal bearing is structured to slide in a low friction, rotational manner about a central axis of rotation 27 while supporting a radial load $L_R$ normal to the central axis of rotation 27.

Likewise, FIGS. 5 and 6 show a third embodiment of the bearing 10 having a rotary thrust-type bearing configuration. At least one spacer 32 is layeredly positioned between first and second slide surfaces 28 and 30, respectively. An exemplary number of four spacers 32 is shown in FIGS. 5 and 6 each having a pair of opposing spacer slide surfaces 33 which are adapted to slide in surface-to-surface contact relative to an adjacently positioned corresponding slide surface 28, 30, 33. Each slide surface 28, 30, 33 has a generally washer-shaped configuration oriented parallel to each other and coaxial along a central axis of rotation 34. And the slide surfaces 28, 30, 33 are designed to slide in a low friction rotational manner about the central axis of rotation 34 while supporting an axial load $L_A$ along the central axis of rotation 34.

And finally in FIGS. 7 and 8, fourth and fifth embodiments, respectively, of the bearing 10 are shown having a configuration capable of supporting both a radial and axial load. In particular, FIG. 7 illustrates a combination journal and thrust bearing configuration where at least one spacer 43 (three spacers shown) is layeredly positioned between a first slide surface 35 and a second slide surface 39. The first and second slide surfaces 35, 39 are preferably the facing surfaces of a cylindrical stationary member 38 and a rotational member 42. As can be seen in FIG. 7, the first slide surface 35 has a journal surface portion 36 and a rim surface portion 37. And the second slide surface 39 likewise has a journal surface portion 40 radially parallel to the journal surface portion 36 of the first slide surface 35, and a thrust surface portion 41 parallel to the rim surface portion 37 of the first slide surface 35. Additionally, each spacer 43 has a pair of opposing spacer slide surfaces 44. And each spacer slide surface 46 has a journal slide surface portion 45 and a thrust-rim slide surface portion 46. As can be seen in FIG. 7, the thrust surface portion 41, rim surface portion 37, and thrust-rim slide surfaces 46 are oriented parallel to each other, and the journal surface portions 40, 36 and the journal slide surface portions 45 are also oriented parallel to each other and coaxial about a central axis of rotation 47. In this manner, the slide surfaces 35, 39, 44 are designed to slide in a low friction rotational manner about the central axis of rotation 47 while supporting an axial load $L_A$ along the central axis of rotation 47 and a radial load $L_R$ normal to the central axis of rotation 47. Similarly in FIG. 8, a combination of spacers 52 having a pair of opposing spacer slide surfaces 53 is shown layeredly positioned between a first slide surface 48 and a second slide surface 50. The slide surfaces 48, 50, 53 are adapted to support both a radial load $L_R$ normal to a central axis of rotation 54 and an axial load $L_A$ along the central axis of rotation 54 without requiring separate and distinct journal and thrust portions. In particular, the slide surfaces are oriented diagonal to the central axis of rotation when viewed in partial cross-section as shown in FIG. 8.

Low friction sliding is possible in all the structural embodiments shown in FIGS. 1–8 by the presence of a lubricant 11 between the slide surfaces (e.g. 12, 14, 17, 18 in FIGS. 1, 2). The method of lubrication can be by external application or by self-lubrication, i.e. by choosing a solid lubricant for the spacer material. Therefore, in one embodiment, the bearing 10 comprises means for reducing friction which is preferably a lubricant 11 having a low coefficient of friction deposited between the slide surfaces. And in an alternative embodiment, each of the spacer slide surfaces (e.g. 17, 18 in FIGS. 1, 2) are pre-bonded with a solid lubricant, such as the polymer sold under the trademark Teflon, having a low coefficient of friction. To facilitate sliding even further in the alternative embodiment, any number of spacers can be utilized in the bearing 10, and is limited only by design parameters and costs.

The lubricant can be selected from any number of commercial and non-commercial lubricant types, including fluids, such as oil, and solid lubricants, such as organics, polymers, metals, inorganics, and glasses. Selection of a lubricant will be determined by various bearing design parameters, including load, relative velocities of moving parts, and temperature. Common organic lubricants are soaps, fats, waxes, and greases. Notably, "grease" is defined and used herein as a semi-fluid lubricant. Further, "fluid lubricant" is used herein to include both fluid and semi-fluid lubricants, including those materials having a gel-like consistency, such as greases.

In this manner, operation of the bearing 10 in the structural embodiments shown in FIGS. 1–8 will involve a particular sliding motion while supporting a load. Because the contact between the slide surfaces is surface-to-surface contact, the load exerted on the bearing 10 is more uniformly distributed throughout the surface, rather than concentrated on a relatively small area of contact. This provides an improved and greater capacity to sustain and support heavy and impact loads under extreme conditions, which would otherwise cause "pits," i.e. indentations formed on the race surface, and/or cause deformation and damage to the balls or rollers themselves at the contact points.

Additionally, operation of the bearing 10 will involve facilitated low friction sliding due to the presence of lubrication between the slide surfaces. Also, the relative sliding velocities between adjacent slide surfaces will be less than the relative sliding velocities between the first and second slide surfaces. While the precise relationship of the relative motion between slide surfaces will vary depending on load conditions and selection of lubricant, the absolute velocity of a slide surface is lower at a position near the stationary one of the first and second slide surfaces than at a position near the non-stationary one. One advantage of this reduction in relative velocities between moving surfaces is the consequential reduction of heat generated from friction, which can break down a lubricant at high sliding velocities. Although the total heat generated will remain the same in the aggregate, the frictional heat generated at the each contact surface, i.e. slide surface, will be substantially lower to prevent the break down of the lubricant.

An example of the benefit derived from this reduction in relative velocities can be best illustrated in the journal bearing application. Due to loss of lubrication under extreme heat conditions at high RPM's, there is a possibility of fusing or welding between the moving surfaces, which can irreversibly damage the bearing and even the machinery it supports. The use of multiple layers of spacers functions two-fold to (1) reduce the relative velocities of the slide surfaces, as discussed above, and (2) act as a multi-layered "buffer." In the case of lock-up between adjacent slide surfaces, the bearing will continue to slide between the remaining slide surfaces. Even a single spacer or sleeve will still be able to rotate if one of its slide surfaces locked up under extreme temperatures. This functions as a fail safe mechanism to prevent damage to the moving/rotating part supported in the machine or mechanism.

Although not shown in the drawings, it is commonly known in the relevant art of bearing design to incorporate grooves along the slide surfaces of the spacers as well as the first and second slide surfaces, whereby fluid lubricants, such as oil, may be drawn or forced therethrough. The grooves operate to ensure proper lubrication, especially under heavy load conditions, by keeping the sliding surfaces consistently wet and lubricated during operation.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A method for rotatingly and longitudinally supporting a shaft in a stationary member, said shaft having a longitudinal axis, comprising the steps of:

forming a frusto-conical step in said shaft to provide an enlarged shaft length, a frusto-conical length and a reduced shaft length, said frusto-conical length having a shaft frnsto-coiijcal angle with respect to the longitudinal axis of said shaft;

a forming a frusto-conical support surface in a stationary member, said frusto-conical support surface having a support frusto-conical angle equal to said shaft frnsto-conical angle;

placing at least two frusto-conical spacers comprising bearing members between said frusto-conical step in said shaft and said frusto-onical support surface in said stationary member, said spacers having a spacer frusto-conical angle equal to said shaft frusto-conical angle and said support frusto-conical angle, said at least two frusto-conical spacers having a central opening larger than an outside diameter of said reduced shaft length, said at least two frusto-spacers each having a pair of opposing spacer slide surfaces; and providing means for reducing friction between said slide surfaces whercby said reduced shaft length is supported to permit rotation and to support longitudinal pressure in the direction of said central opening of said spacers.

* * * * *